Aug. 16, 1932.  R. H. JORDAN  1,871,455
METHOD OF STARTING AN INDUCTION MOTOR
Filed Sept. 22, 1930
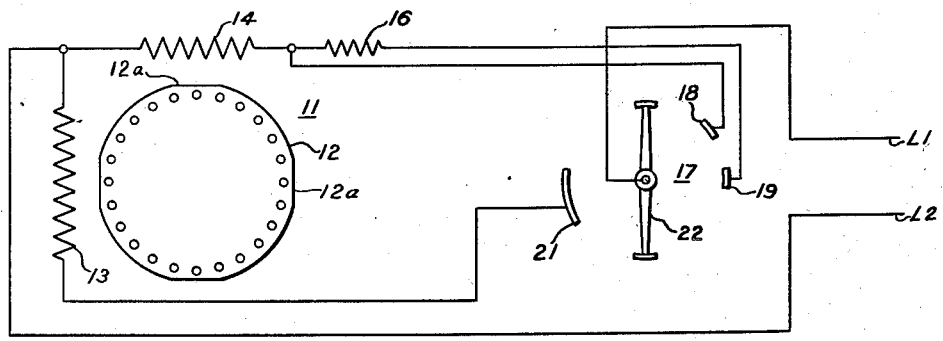
INVENTOR
Richard H. Jordan
BY
[signature] Carr
ATTORNEY Patented Aug. 16, 1932

1,871,455

UNITED STATES PATENT OFFICE

RICHARD H. JORDAN, OF SPRINGFIELD, MASSACHUSETTS, ASSIGNOR TO WESTINGHOUSE ELECTRIC & MANUFACTURING COMPANY, A CORPORATION OF PENNSYLVANIA

METHOD OF STARTING AN INDUCTION MOTOR

Application filed September 22, 1930. Serial No. 483,486.

My invention relates to alternating current motors, and particularly to induction-synchronous motors of small size.

An object of my invention is to provide a relatively simple system for starting an induction-synchronous motor.

Any small split-phase induction motor having a main and an auxiliary field or stator winding and a squirrel-cage rotor may be caused to operate as a synchronous motor by milling a predetermined number of flats on the rotor, the number being preferably equal to the number of poles on the stator. A motor of this type has, however, the disadvantage of a relatively small pull-in torque. The pull-in torque may be increased by decreasing the air-gap, but one result of this decreased air-gap is that the rotor will have as many locked points as the motor has poles, this being caused by a purely magnetic action based on the fact that the resistance to the field flux is a minimum in that part of the rotor which has not been milled or flattened. If such a motor should stop in a position where the resultant field of the two stator windings and the high-spots of the rotor coincide, it will be found impossible to start the motor because of the magnetic lock-in, which is greater the smaller the air gap and which overcomes the rotating torque of the field.

My invention relates to a relatively simple method of and means for starting an alternating current motor of this type.

In practicing my invention, I provide, in combination with a split-phase induction motor having a main and an auxiliary field and a rotor having a predetermined number of flats provided on its periphery, a resistor of predetermined resistance connected in series circuit with the auxiliary or starting field and a switch by the continued turning of which I first connect the starting winding in the circuit, then the main winding in addition thereto, and finally the resistor in series circuit with the starting winding.

The single figure of the drawing is a schematic and diagrammatic representation of the device and circuit embodying my invention.

An alternating current motor, designated generally by the numeral 11, includes a squirrel-cage rotor 12 which is mounted upon a suitable shaft (not shown). The rotor 12 has a plurality of flats 12a milled on the outer periphery, the number of which is either equal to the total number of poles or to a certain whole part thereof. A rotor of this kind may be said to have salient poles or to be a geometrically polarized rotor. A main winding 13 and an auxiliary or starting winding 14 are provided, which are shown generally only as any suitable or desired type of such windings on the stator may be employed. I have omitted a specific showing of the stator, as it does not form part of my present invention.

An auxiliary resistor 16 having a predetermined ohmic resistance is provided, and is connected in series circuit relation with the starting winding 14.

A starting switch 17 is provided which includes fixed contact members 18, 19 and 21, and an electric-conducting contact arm 22 which is pivotally mounted for turning movement to engage the fixed contact members in predetermined sequence. The contact arm 22 is connected to conductor L1 of a supply circuit, the other conductor of which, L2 is connected to the junction of the main and of the starting windings. The other end of the main winding is connected to fixed contact member 21, while the junction of starting winding 14 and of resistor 16 is connected to contact member 18. The other end of resistor 16 is connected to contact member 19.

Irrespective of the peripheral position in which the rotor may have stopped, if it is desired to restart the motor and arm 22 is turned in a clockwise direction, it will first engage contact member 18 thereby closing an energizing circuit from conductor L1 through starting winding 14 and from there to conductor L2. The energized starting winding 14 will cause the rotor to move suddenly into a position in which the least magnetic resistance is offered by it to the passage of the flux generated by the starting winding alone therethrough, and it may be noted that this position will be one in which the rotor has been turned through an angle of 45° from the position shown in the drawing. Upon further turning of the arm 22, contact member 21 will be next engaged, whereby the main field winding 13 is also energized. The instantaneous position of the resultant field is thereby changed from one peripheral position to another, and the rotor will move therewith.

As both the main and the starting fields are connected to the line, a rotating field is generated, affecting the rotor causing it to rotate and to increase in speed in a well known manner. It is impossible, however, to reach synchronous speed, as the electrical phase angle between the two phases is not coincident with the mechanical location of the same. This is overcome, upon continued turning of arm 22, which finally engages not only contact member 21 but also contact member 19, thereby connecting, in series circuit with the auxiliary winding, a resistor of such value that the electrical and the mechanical angle of the split phase will substantially coincide. This results in a high pull-in torque with a fairly low watt input into the starting winding, as I have found that the value of the resistance of resistor 16 is relatively high. As long as switch arm 22 remains in the position in which one end thereof engages contact member 19 and the other end engages contact member 21, the rotor will operate at synchronous speed.

The method particularly embodying my invention thus provides relatively simple means for starting an alternating current motor having a main and a starting winding, for bringing it up to and then maintaining it at a synchronous speed.

Various modifications may be made in the method embodying my invention without departing from the spirit and scope thereof, and I desire, therefore, that only such limitations shall be placed thereon as are imposed by the prior art or are set forth in the appended claims.

I claim as my invention:

1. The method of starting a split-phase induction motor having a geometrically polarized rotor, a main and an auxiliary stator winding and a resistor connected in series circuit with the auxiliary winding, which includes the steps of first energizing the auxiliary winding, then energizing the main winding while maintaining the energization of the auxiliary winding, then maintaining the energization of the main winding and energizing the resistor in series circuit with the auxiliary winding.

2. The method of starting a split-base induction-synchronous motor having a geometrically polarized rotor, a main and an auxiliary stator winding and a resistor in series circuit with the auxiliary winding, which includes initially connecting the auxiliary winding alone to an energizing circuit, then connecting the main winding to an energizing circuit while maintaining the connection of the auxiliary winding to the energizing circuit to cause the motor to operate as an induction motor and then connecting the resistor in series circuit with the auxiliary winding to energize simultaneously the resistor the auxiliary and the main windings to cause the motor to operate as a synchronous motor.

3. The method of starting a locked rotor of an induction-synchronous motor having a geometrically polarized rotor, a main winding, an auxiliary winding and a resistor of relatively high resistance connected in series circuit with the auxiliary winding which comprises energizing the auxiliary winding alone to cause the rotor to move out of its locked position to another fixed position, then energizing the main winding while maintaining the energization of the auxiliary winding to effect rotation of the rotor at sub-synchronous speed, and then maintaining the energization of the main winding and energizing the resistor in series circuit with the auxiliary winding to effect rotation of the rotor at synchronous speed.

4. The method of starting a split-phase induction-synchronous motor having a geometrically polarized rotor, a main and an auxiliary stator winding, which includes the steps of first energizing the auxiliary winding at its full normal voltage, then energizing the main winding at full normal voltage while maintaining the energization of the auxiliary winding and then reducing the energization of the auxiliary winding while maintaining the full energization of the main winding.

In testimony whereof, I have hereunto subscribed my name this 17th day of September, 1930.

RICHARD H. JORDAN.